(12) United States Patent
DiTomaso et al.

(10) Patent No.: US 10,664,645 B2
(45) Date of Patent: May 26, 2020

(54) SYSTEM AND METHOD FOR TRANSPOSING WEB CONTENT

(71) Applicants: Joseph DiTomaso, New York, NY (US); William Beckler, New York, NY (US)

(72) Inventors: Joseph DiTomaso, New York, NY (US); William Beckler, New York, NY (US)

(73) Assignee: ALLTHEROOMS, New York, NY (US)

( * ) Notice: Subject to any disclaimer, the term of this patent is extended or adjusted under 35 U.S.C. 154(b) by 105 days.

(21) Appl. No.: 15/726,687

(22) Filed: Oct. 6, 2017

(65) Prior Publication Data

US 2018/0101504 A1    Apr. 12, 2018

Related U.S. Application Data

(60) Provisional application No. 62/405,328, filed on Oct. 7, 2016.

(51) Int. Cl.
| | |
|---|---|
| *G06F 17/20* | (2006.01) |
| *G06F 40/103* | (2020.01) |
| *G10L 13/04* | (2013.01) |
| *G06T 13/80* | (2011.01) |
| *G06F 16/958* | (2019.01) |
| *G10L 13/00* | (2006.01) |
| *G06F 40/279* | (2020.01) |
| *G06T 3/40* | (2006.01) |

(Continued)

(52) U.S. Cl.
CPC .......... *G06F 40/103* (2020.01); *G06F 16/958* (2019.01); *G06F 40/279* (2020.01); *G06T 13/80* (2013.01); *G10L 13/00* (2013.01); *G10L 13/043* (2013.01); *G06F 40/186* (2020.01); *G06T 3/20* (2013.01); *G06T 3/40* (2013.01)

(58) Field of Classification Search
CPC combination set(s) only.
See application file for complete search history.

(56) References Cited

U.S. PATENT DOCUMENTS

| | | | |
|---|---|---|---|
| 7,366,718 B1 * | 4/2008 | Pugh | G06F 16/355 |
| 2008/0005666 A1 * | 1/2008 | Sefton | G06Q 99/00 |
| | | | 715/234 |

(Continued)

*Primary Examiner* — Shahid K Khan
(74) *Attorney, Agent, or Firm* — Buckley, Maschoff & Talwalkar LLC (57) ABSTRACT

Provided are a system and method for enhancing static web content. In one example, the method includes extracting text content describing an item and extracting still images of the item from a host website, automatically converting the extracted text content into audio by combining keywords from the extracted text content with auto-generated supplemental words related to the item to generate an audio script, automatically converting the extracted still images into moving images by arranging the still images extracted in a sequence and adding movement to the still images to generate a video, and simultaneously playing the automatically generated audio script and the automatically generated video in response to a selection of the item. By creating and overlapping video and audio from still images and text of a listing on a website, the listing becomes more entertaining and captivating to a viewer.

18 Claims, 6 Drawing Sheets

(51) Int. Cl.
*G06T 3/20* (2006.01)
*G06F 40/186* (2020.01)

(56) References Cited

U.S. PATENT DOCUMENTS

2010/0067882 A1* 3/2010 Axen .................... G11B 27/031
 386/241
2015/0199647 A1* 7/2015 Shin .................... G06Q 10/1053
 705/321

* cited by examiner

SYSTEM AND METHOD FOR TRANSPOSING WEB CONTENT

CROSS-REFERENCE TO RELATED APPLICATIONS

This application claims the benefit under 35 USC § 119(e) of U.S. Provisional Patent Application No. 62/405,328, filed on Oct. 7, 2016, the entire disclosure of which is incorporated herein by reference for all purposes.

BACKGROUND

The World Wide Web is a rich environment that includes web pages, blogs, news, wikis, social networking sites, research services, media types, and more. Web content is what draws a reader interest causing the reader to view a web page and it is also what can keep the attention of the reader. Web content may include various forms such as text, animation, images, video, sound, and the like. Of these types of content, textual web content and still images and static text content can be of the least interest to the reader. Text content typically includes written words while still images include photographs that have been converted to digital from, without the enhancement of sound, video or animation. Therefore, textual web content and still images can struggle to attract and attain readers for much longer than a few seconds before the reader moves away from the page.

While static content such as still images and digital text may be the preferred method for providing information about items on the Web, for example, products, job opportunities, services, and the like, in an online viewing environment, the static content requires the reader to do all the work. For example, an online merchant website may have many web pages devoted to listing products and services available for purchase. The listings often include still images of the product along with written description about the product which provides a reader with various details such as price, warranty, availability, location, and the like. In this case, the reader must scan through and find relevant text of interest and separately scroll through the images using commands. Furthermore, a reader may have to click on and view multiple pages of textual data and still images to gain a comprehensive understanding of the item they are viewing. Therefore, what is needed is a technology that improves a reader experience when interacting with the web and provides the reader a comprehensive understanding of an item through minimal effort on the part of the reader.

SUMMARY

In one general aspect, provided is a computer-implemented method that may include at least one of extracting text content describing an item and extracting still images of the item from a host website that includes listings of a plurality of items, automatically converting the extracted text content into audio by combining keywords from the extracted text content of the item from the host website with auto-generated supplemental words related to the item to generate an audio script, automatically converting the extracted still images from the host website into moving images by arranging the still images extracted from the website in a sequence and adding movement to the still images to generate a video, and simultaneously playing the automatically generated audio script and the automatically generated video in response to a selection of the item.

In another general aspect, provided is a computing system that may include at least one of a network interface configured to receive website data from a host website including images and a description associated with an item listed on the host website, a processor configured to extract text content describing the item and the still images of the item from the received website data, automatically convert the extracted text content into audio by combining keywords from the extracted text content of the item from the host website with auto-generated supplemental words related to the item to generate an audio script, and automatically convert the extracted still images from the host website into moving images by arranging the still images extracted from the website in a sequence and adding movement to the still images to generate a video, and an output configured to simultaneously play the automatically generated audio script and the automatically generated video in response to a selection of the item.

Other features and aspects may be apparent from the following detailed description, the drawings, and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Compelling online content is critical for attracting web visitors. Static content is typically the least interesting for a reader in comparison to video, audio, animation, virtual reality, and the like. One type of static content is still images or photographs. An image typically includes a picture of an object, a person, or an environment. However, after an initial glance, a viewer's concentration and focus may be lost or distracted. As a result, the viewer may move to a next page or site, or another area on the page, after only a few seconds. Another type of static content is textual content which may include a description, a list of technical specifications, price, availability, location information, and the like, within a web page, a blog, an online publication, or the like. Textual web content often includes a description or other writing composed of words, sentences, paragraphs, etc., which describes a subject matter such as an item or topics related to an item. Textual web content requires a user to read the text and comprehend the text. When both text and images are used to provide information about an item, the user must view both the images and the text (often via multiple pages) to gather a full understanding of the item.

The example embodiments provide a web-based software (e.g., program, application, service, etc.) system that extracts static content (e.g., still images and text) from a web page related to an item and converts the static content into an audio and a video that can be simultaneously output in place of the static content. The system may enhance web content by extracting still images and text-based data from a host website and convert the extracted data into audio and video thereby improving viewer interest. The enhanced content may be output on a same site or via a different site such as a search site. The system may extract still images that are displayed within a listing associated with an item or a product for purchase and generate a video using a program that moves the images. The still images may be ordered into a sequence and the images may be moved within a video player or other window using panning, zooming, expanding, shrinking, and the like, in the form of a video. In some embodiments, the still images may be extracted from multiple web pages and combined into a video that is played on a single page thereby relieving the viewer from having to visit different web pages. Prior to generating the sequence of images, the software may condense the images by discarding one or more images from the video generation based on an image quality, a duplication with another image, a cut-off image, an image not being associated with the item, and the like.

The system may also enhance web content by extracting textual content from the item listing such as a description of a product, technical details about a product, user reviews of the product/property, geographical location information, contact information, price, availability, and the like, and convert the extracted text content into an audio script. The system may extract entire sections of text content or it may condense the textual content by extracting only keywords, sentences, particular sections, or the like, of the text content. In addition, the system may combine text content from multiple sections of a website and combine the text content with supplemental content not listed on the website to generate an audio script that flows smoothly for a listener and improves user experience. For example, keywords and other text content may be extracted from multiple different web pages and combined into a single audio script with additional supplemental content related to the item included in the listing (e.g., job, property, service, product, etc.) thereby relieving the listener from having to visit different web pages and peruse both images and description separately.

Both the still image content and the text content may be condensed to provide a more succinct description and visual representation of the item. For example, keywords or sentences may be extracted from a larger body of textual content or multiple sections of textual content. In addition, still images may be extracted while other images may be removed or discarded prior to generating the video. Furthermore, the system may overlap a playing of the generated video and a playing of the generated audio to simultaneously output the audio and video to provide the user with both sources of content at the same time. Accordingly, when a viewer/listener selects a listing on a website such as a property listing, instead of having to separately view still images and text description (often on multiple web pages), the user may receive a combination of video and audio which are transposed from the still images and text description and which are played on a same web page thereby significantly improving the user experience.

For purposes of description, various examples herein are described with respect to a property listing such as a travel-related website, home buying website, hotel website, or the like. However, the embodiments herein are not limited to property listings and may be applicable to all types of listings such as job postings, automobile sales, restaurant listings, service listings, or any other item that can be posted via the web and include a format that includes images and text description. That is, the embodiments herein may be applied to any web-based post that includes textual description and still images which can be transposed into audio and video content. Also, the examples herein are described with respect to static content being extracted from a host website (i.e., a first website) and converted into enhanced content on a second website. However, the original content and the enhanced content may be extracted and output via a single website rather than two or more websites.

Figure 1:
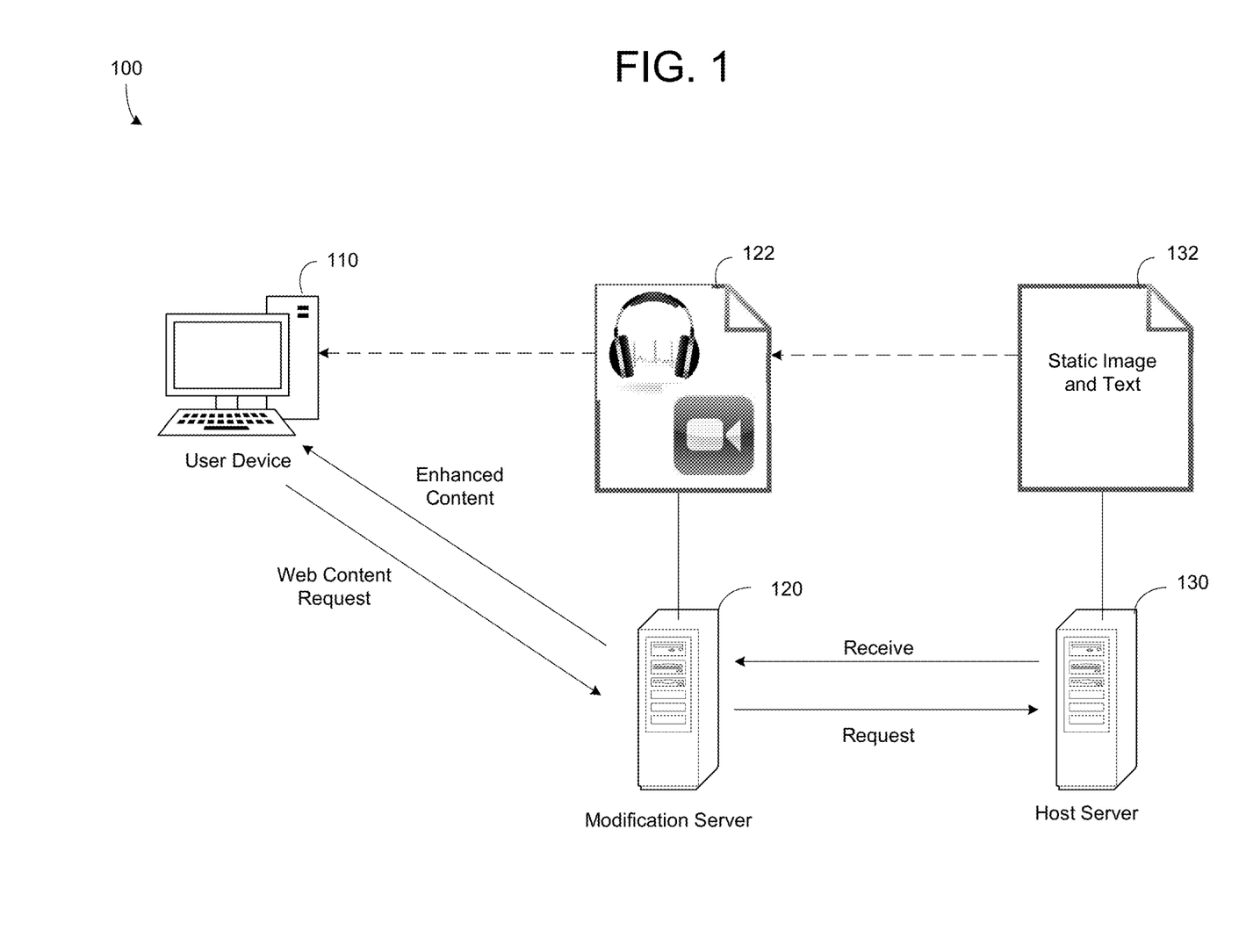
FIG. 1 is a diagram illustrating a system for enhancing static web content in accordance with an example embodiment.

FIG. 1 illustrates a system 100 for generating enhanced web content in accordance with an example embodiment. Referring to FIG. 1, the system 100 includes a user device 110, a content modification server 120, and a host server 130. In this example, the host server 130 may host various listings of items such as job listings, restaurant listings, property listings, and the like. A listing described herein may include any post related to an item including at least one of images and description content. The content modification server 120 may be a host server of a second website such as a search site, travel comparison site or the like in which content from multiple websites is aggregated to provide a user with a comprehensive search listing for an item such as a job, rental property, service, restaurant, or the like. The user device 110 may be a smart phone, a tablet, a computer, a kiosk, an appliance, and the like. The user device 110, the content modification server 120, and the host server 130 may be connected to each other via a network such as the Internet, a private network, or the like.

The user device may have installed therein a web browser which displays a user interface including a window associated with the web browser. The user device may run the web browser and a user thereof may input a web address of a website, for example, a website hosted by the content modification server 120, the host server 130, or the like. For example, the website may be a travel related website that includes rental property listings (e.g., hotels, vacation rentals, boats, and the like). As another example, the website may be any merchant related website with items (e.g., products and/or services) for sale posted or indicated there within. As another example, the website may be a job postings site, a restaurant listings site, or the like. The user device 110 may select a web page of a website provided by either of the content modification server 120 and/or the host server 130.

According to various embodiments, static content 132 of a web page hosted by the host server 130 may be extracted by the content modification server 120 and converted into more appealing content having a form of audio and video. For example, the content modification server 120 may obtain data from the host server 130 at intervals of time and store data related to postings and listings hosted by the host servers 130. Here, the content modification server 120 may convert the text content and still imagery from the host servers 130 into audio and video and store the audio and video such that the audio and video content is automatically provided to the user device 110 when the user device 110 requests listing content via the website hosted by the content modification server 120. As another example, the content modification server 120 may receive a request from a user via the website hosted by the content modification server 120 and in response, automatically extract content from a host website hosted by the host server 130, convert the content into audio and video, and output the audio and video in real-time. For example, the content modification server 120 may include a local cache where content extracted from host server 130 can be temporarily stored, converted into audio and video, and output to the user device 110.

In some embodiments, the content modification server 120 may be a web server that auto-detects static web content 132 from various sources on the web such as websites, web pages, databases, multiple host servers 130, and the like. In some examples, the detected web content may be related to a particular industry or topic (e.g., travel, job opportunities, services, home buying, etc.) As a non-limiting example, the static content 132 may be information related to information (e.g., vacation home rental, hotel, and the like), rental car information, and the like. As another example, the static content 132 may be product related information (e.g., shoes, clothing, equipment, tools, appliances, devices, etc.), financial related information, sports related information, activity related information, and the like. To auto-detect the web content, the content modification server 120 may perform a crawl of one or more web sources (e.g., web sites, databases, etc.) on a periodic basis, for example, daily, hourly, weekly, and the like, and store the web content detected therefrom in a local database or an external database connected thereto.

In one example, a website provided by the host server 130 includes static content of a plurality of accommodation listings (e.g., vacation rentals, hotels, and the like). Each listing may include one or more images of a real property associated with the accommodation listing, and text content such as user reviews, descriptions of the property, star ratings, information about a geographical area at which the property is located, events at the property, contact information, availability, pricing, and the like. However, static content 132 is not the most interesting content. In addition, a user may have to expend time and effort to identify all of the textual content associated with an accommodation listing when the text content is dispersed throughout different tabs or on multiple pages. In this case, it may be difficult to ascertain desired information from a webpage without scrolling up and down and moving between web pages of the website. Furthermore, the text content may include small print which is difficult to see/comprehend.

According to various embodiments, the content modification server 120 may enhance the static content 132 from the website provided by the host server 130 by extracting text information and still images and generating audio and video content 122 associated with the accommodation listing. As shown in FIG. 1, the host server 130 may initially provide a static listing that includes still images and text related to an accommodation listing. The content modification server 120 may extract the initial web content and generate audio and video content 122 associated with the accommodation listing, and provide the audio and video content 122 to the user device 110 when the user requests information about the listing. The audio content may be generated based on a script or a predefined template including one or more keywords that are of interest. As another example, the audio may be generated differently based on a particular type of the item. For example, a boat may have a different audio content than a laundry machine, and the like. Meanwhile, the video content may be generated by arranging the still images in a sequence and moving the images (e.g., panning and zooming) within the frame of a video player.

Figure 2:
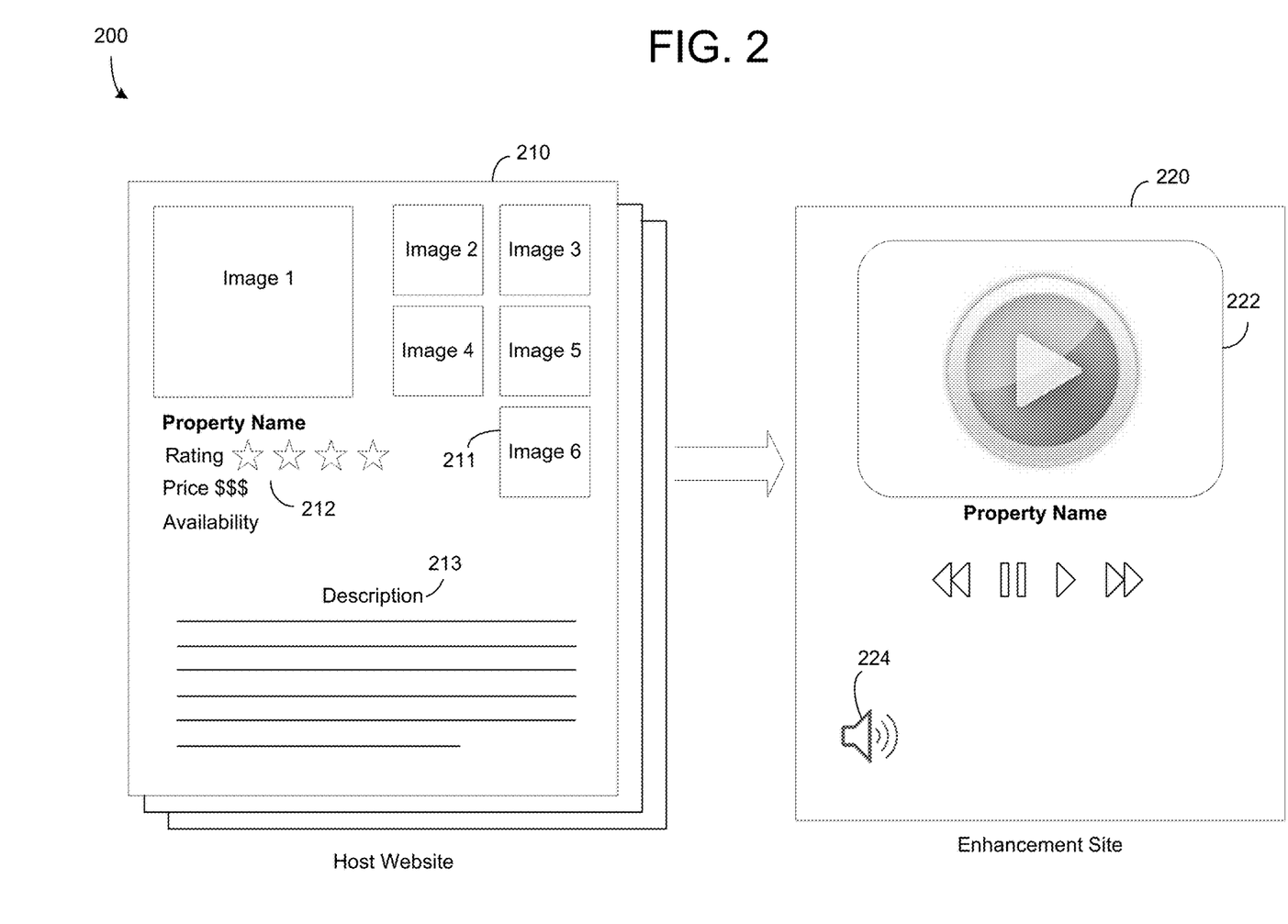
FIG. 2 is a diagram illustrating a process of outputting an enhanced item listing via a website in accordance with an example embodiment.

FIG. 2 illustrates a process 200 of outputting an enhanced item listing via a website in accordance with an example embodiment. In this example, the item listing is a property listing such as a listing for a vacation rental, hotel, home purchase/rental, or the like. The original data may be hosted on a host website 210 and may include static content such as a plurality of images 211, property details and characteristics 212 and a property description 213. Although not shown, the host website 210 may include additional information about the property such as user reviews, contact information, and the like. Meanwhile, an enhancement site 220 may extract data from host website 210 (as well as other host websites) and generate enhanced content of the static content. For example, the enhancement website 220 may convert static images 211 into a video 222 and convert the text content (212, 213, tec.) into an audio 224 and simultaneously output the converted video and audio via the enhancement website 220.

According to various aspects, a software program and system may extract static content from individual pages (e.g., property page on host website 210) and turn the static content (verbiage and images) and into a video 222 and an audio 224 about the property listing. The static content may be stored in a database and converted at a later time. As another example, the static content may be converted before it is stored in the database and accessed by the enhancement site. The software may be stored and executed on a same device that hosts the enhancement site 220 or it may be stored and executed by a remote device that is in communication with the enhancement site 220 via a network. The software and system may crawl the Internet, databases, resources, and the like, and grab the content form multiple sites and store the content into a database. As another example, the software may grab the content "on-the-fly" and temporarily store the static content in a temporary memory such as a local cache, convert the static content into moving/audio content, and output the converted content via the enhancement site 220, without having to pre-store the content in advance.

The conversion described herein may be triggered by a user entering the enhancement website 220 and navigating to a property page and viewing a link which is live on the host website 210. The enhancement site 220 may be a search site or the like which can be used to aggregate or accumulate item search results from multiple sites and provide a comparison of the item content from multiple different host sites. Rather than display the static content live on the host website 210, the enhancement site 220 ma convert static image content 211 from the host website 210 into video content 222. In addition, the text content that is provided at the bottom of the host website 210, may be extracted and put into a template where it is read as the audio 224 along with the video 222.

According to various aspects, the static images 211 may be auto-transposed into the video 222 and the static text content (e.g., at the bottom of the page, on a second page, etc.) may be auto-converted into an audio script, converted into speech, and read as an audio 224 while the video is simultaneously playing. The video content 222 and the audio content 224 may be overlapped with one another such that they each play at the same time. In some embodiments, the video 222 is a moving slideshow. In this example, the audio 224 may be overlapped with the video while the video is fading in and out between image and image.

Prior to the embodiments described herein, in order to have content converted to video and audio a user would have to download a tool and install the tool. Then, the user would have to download images and run the tool to convert the images into video. The user would also need to perform the same actions for audio but first they would have to find the description and save it into the tool to convert it. The user would then somehow have to link the two together. The example embodiments significantly improve upon this process by automatically extract static content (images and text) read from a web page and converts the static content automatically into video and audio without requiring any user interaction. Furthermore, the system can discard images that are fuzzy, cutoff, poor quality, deduplication between other images. Also, the system can enhance the textual description by supplementing the textual description with additional language. For example, the system may extract keywords or other language from the web page and add that to the description to generate an audio. As another example, the system may insert the words into a template that includes additional wording based on a designer preference.

Figure 3:
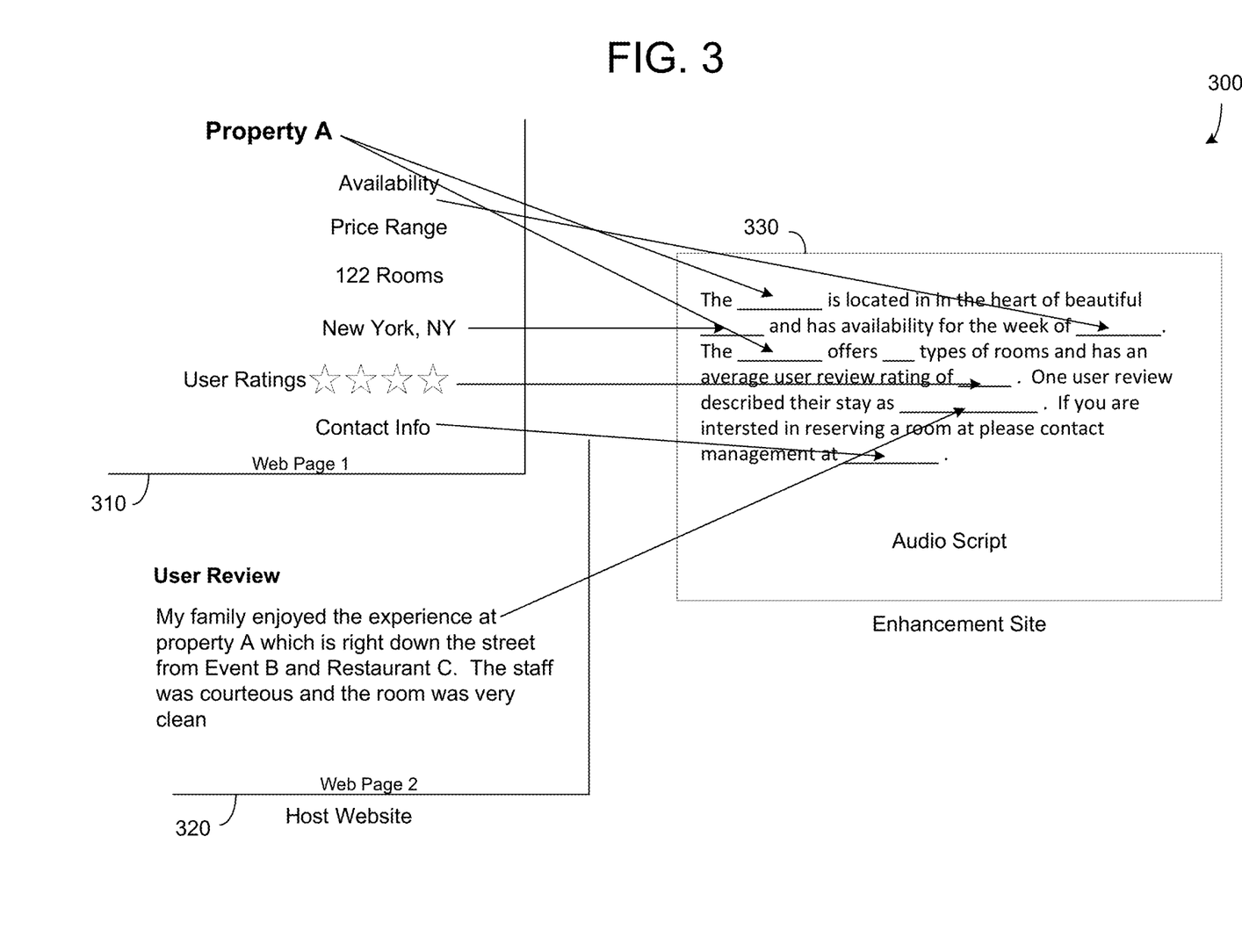
FIG. 3 is a diagram illustrating a process of extracting text content and generating an audio script in accordance with an example embodiment.

FIG. 3 illustrates a process 300 of extracting text content from a host website and generating an audio script in accordance with an example embodiment. In this example, the host website includes a plurality of web pages including a first web page 310 and a second web page 320. Meanwhile, textual content from various sections of both the first web page 310 and the second web page 320 which are related to a common item (e.g., a property listing) may be extracted and added to an audio script 330 which may be read by an enhancement website 330. The text content may include information about an item such as a hotel or vacation rental at a geographical destination including one or more of a name of the property, rental prices, geographical location information of the property, amenities of the property, descriptions of the property, reviews of the property, star ratings of the property, and the like. Here, the audio script includes blank spaces or openings that are to be filled-in with text content from various sections of the property listing shown on the host website 310. For example, keywords may be extracted from text content and inserted into the blanks of audio script 330 or entire passages of text content may be inserted into the blanks of the audio script 330. In this example, the host website includes text sections related to an availability of the property, a price range, a number of rooms, a geographical location, a user rating, contact details, and the like, on a first web page, and user reviews on a second web page 320. Text content may be extracted from sections of both the first web page 310 and the second web page 320 and added to the audio script 330.

Furthermore, the audio script 330 may be based on a template that changes based on a type of listing. For example, the template may be different if the item is a job opportunity instead of a property listing. As another example, the template may be different if the listing is related to a service or a restaurant, rather than a property listing. The template is not limited to a particular style. The template itself may include additional description that is related to the item in a general manner. However, when the template is combined with textual content from the host website, the audio script 330 becomes directed towards specific details of the item listing from the host website. In addition to text content, the audio script 330 may include music, celebrity voices, computerized voices, sounds, and the like, which may be used based on user preferences, a geographical location of the property, a time of year, and the like.

Figure 4:
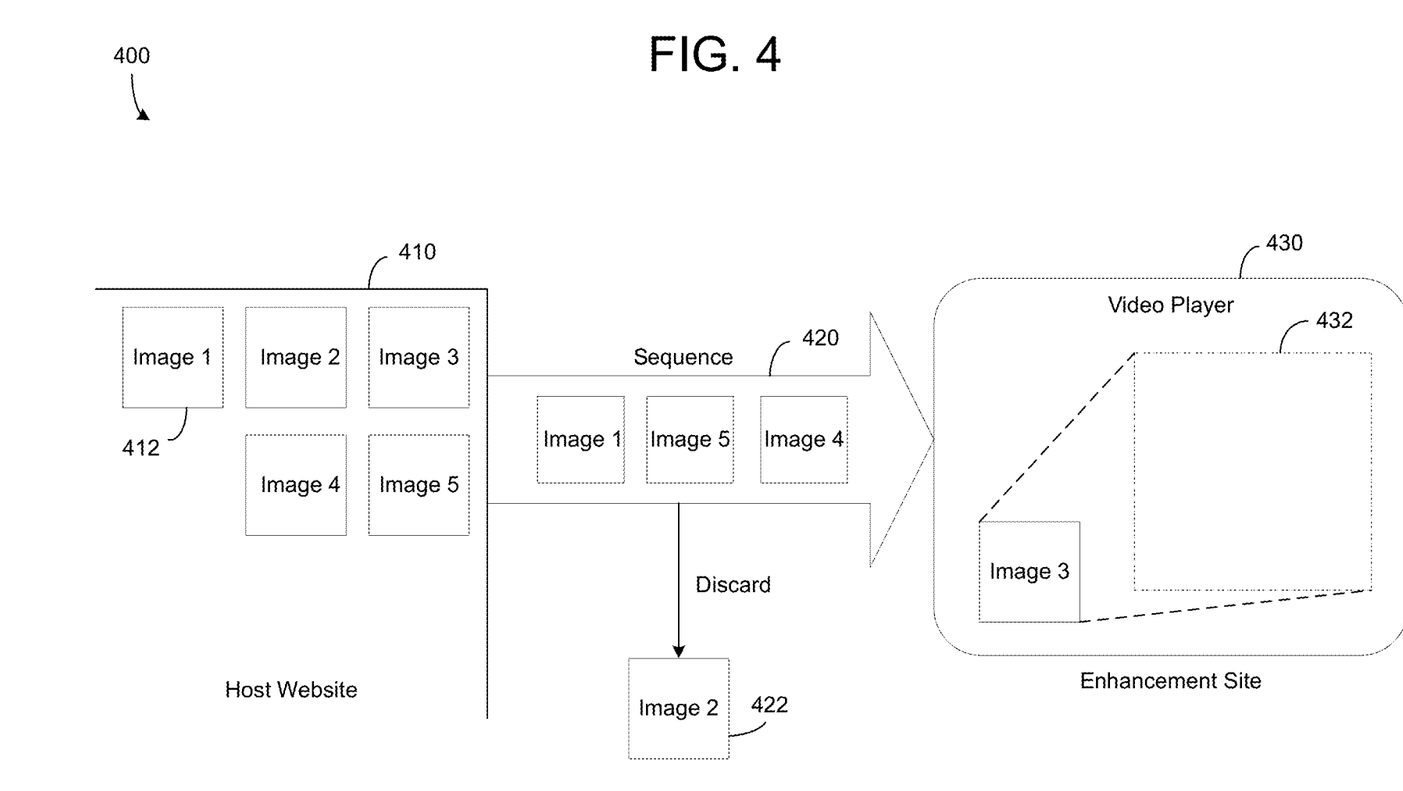
FIG. 4 is a diagram illustrating a process of extracting still images and generating a video in accordance with an example embodiment.

FIG. 4 illustrates a process 400 of extracting still images 411 from a host website 410 and generating a video 432 which is played on an enhancement site 430, in accordance with an example embodiment. In this example, a plurality of still images (e.g., images 1-5) may be extracted from the host website 410 and added to a video being played within a video player of enhancement site 430. Here, a sequence of images 420 are extracted and converted into a video for the enhancement site 430. During the extraction and conversion process, one or more images from the sequence of images 420 may be discarded such as image 422. The image may be discarded based on one or more factors such as poor quality, duplicate, and the like. Also, the images may be ordered in a sequence based on one or more factors provided by the enhancement site 430 or randomly. The sequence may be equivalent to the sequence in which the images are stored on the host website 410, or it may be modified to illustrate certain components or features of the property (or other item) first. For example, the images may be displayed such that room images are shown before pool images, and the like.

The system may generate the video 432 based on the still images 411, for example, using a program that moves the images, overlays text (a.k.a. "video titles"), and adds an audio track combining music and a computerized text-to-speech voice synthesizer that reads the extracted text. The images may be moved by panning, zooming, expanding, decreasing in size, and the like, within the video player of the enhancement site 430.

According to various aspects, the system herein may generate audio/video about an accommodation listing that is more entertaining for a viewer and which is capable of providing information about the accommodation listing to the viewer using audio and video based on data extracted from multiple web pages without requiring the viewer to identify the information from text content on the web pages. For example, the system may generate a more interesting video and audio of the item that captures relevant content while excluding less relevant content thereby condensing information provided from a host website.

Figure 5:
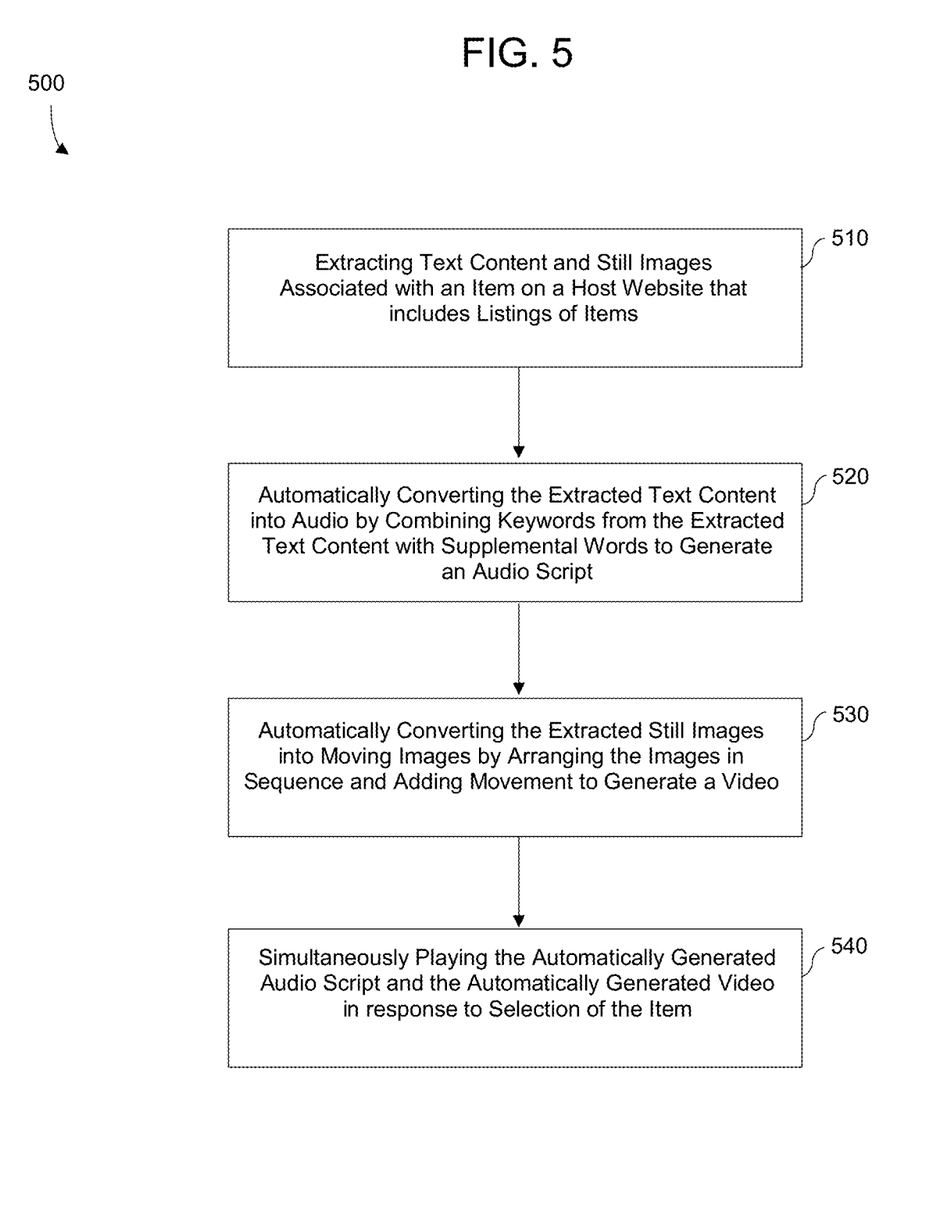
FIG. 5 is a diagram illustrating a method for enhancing static web content in accordance with an example embodiment.

FIG. 5 illustrates a method 500 for enhancing static web content in accordance with an example embodiment. For example, the method 500 may be performed by the modification server 120 shown in FIG. 1, a crawl server, a web server, a host server, a user device, a cloud platform, or a combination thereof. Referring to FIG. 5, in 510 the method includes extracting text content describing an item and extracting still images of the item from a host website that includes listings of a plurality of items. For example, the text content and the still images may be received from a host website which is hosting a listing of the item for sale or viewing. The still images may include a plurality of images taken of or about the item and may be located on a single web page or disposed on multiple web pages. For example, a thumbnail image may be disposed on a first web page of the host website and an expanded image may be shown on a second web page of the host website when the thumbnail is selected on the first web page of the host website. The description of the item may include a description of the product, property, service, job opportunity, and the like. The description may be included in multiple parts of the website and on multiple pages of the host website. For example, a first web page may include a description of an item for sale such as parts, uses, location, availability, and the like, and a second web page may include user reviews describing the item.

In 520, the method includes automatically converting the extracted text content into audio by combining keywords from the extracted text content of the item from the host website with auto-generated supplemental words related to the item to generate an audio script. Furthermore, in 530 the method includes automatically converting the extracted still images from the host website into moving images by arranging the still images extracted from the website in a sequence and adding movement to the still images to generate a video. It should be appreciated that the converting to video in 520 and the converting to audio in 530 may be performed simultaneously or at separate times in either order. The converting may be performed in response to a viewer selecting a listing associated with the item on a second website which provides listings from an aggregation of sites. For example, the second website may be a travel website providing travel-related listings from a combination of source sites. In this case, the second website may monitor/crawl the source/host websites on regular (periodic, random) basis. The second website may display listings corresponding to the host websites however the listings on the second website may be enhanced to include audio and video instead of still images and text content.

In some embodiments, the item may include a property listing on at least one of a rental site, a travel site, and an accommodation site, which is combined with property listings from multiple sites within a cumulative site. In this example, the automatically converting of the extracted text content into audio may include extracting keywords from at least two of a description of the property, a user review of the property, and a geographic location of the property, and inserting the extracted keywords into a template which includes supplemental words related to the property to generate the audio script. Here, the keywords may be extracted from different sections of a web page and from different web pages of the host website and combined into a single audio script that may be read to a listener via a video player on a single web page. The template may include supplemental content that is related to a subject matter of the item listed. For example, the supplemental content may include content that enhances a description of the item by adding language including words, sentences, and phrases before, between, and after keywords extracted from the text content of the host website.

In some embodiments, the automatically converting of the extracted still images may include removing one or more still images extracted from the host website prior to generating the video. For example, the software application described herein may analyze a still image and determine whether the image is of the correct item/subject matter, whether the image is of a predetermined quality, whether the image has been cutoff, and the like, and discard any images that do not meet certain characteristics. As another example, the automatically converting the extracted still images from the host website into the moving images may include adding at least one of panning and zooming to each of the still images to generate the video.

In 540, the method includes simultaneously playing the automatically generated audio script and the automatically generated video in response to a selection of the item. For example, the audio script may include a first duration and the video comprises a second duration that is different than the first duration, and the simultaneously playing may include overlapping a playing of the audio and a playing of the video based on a shorter duration from among the first and second durations. For example, if the audio is the shorter duration, an entire portion of the audio can be overlapped by the video while only a portion of the video is overlapped by audio. The video may be generated by zooming and panning on each of the still images, for example, to create a Ken Burns style video, or the like.

Figure 6:
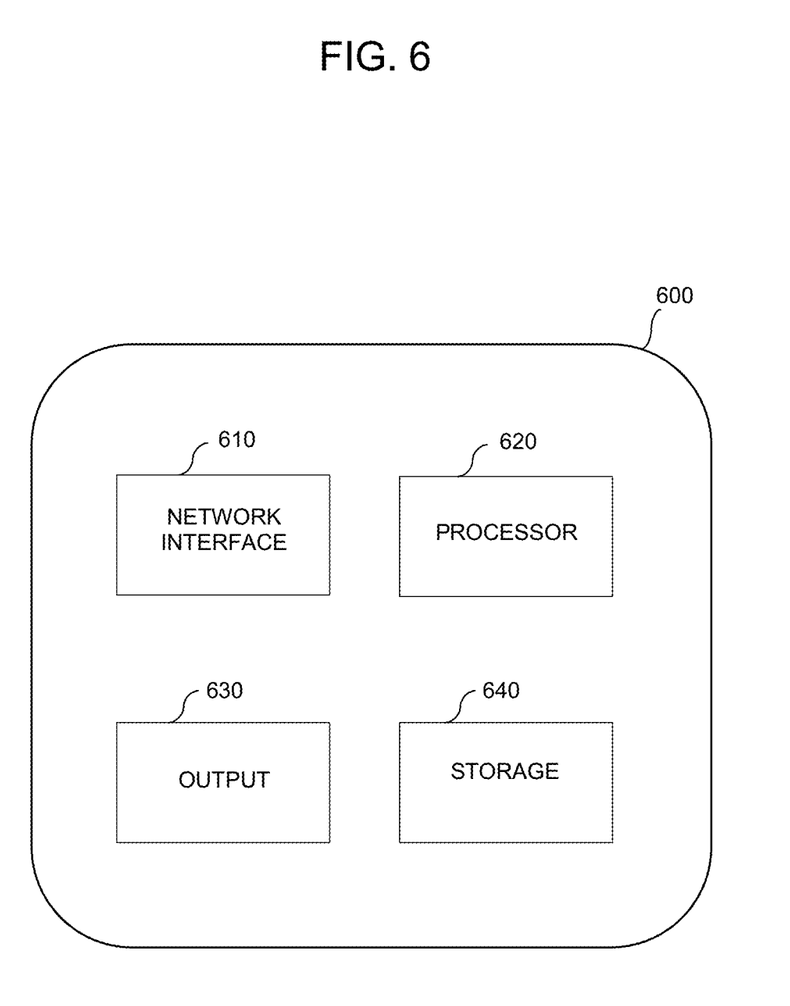
FIG. 6 is a diagram illustrating a computing system for enhancing static web content in accordance with an example embodiment.

FIG. 6 illustrates a computing system 600 for enhancing static web content in accordance with an example embodiment. For example, the computing system 600 may be a database, cloud platform, streaming platform, and the like. As a non-limiting example, the computing system 600 may be content modification server 120 shown in FIG. 1. In some embodiments, the computing system 600 may be distributed across multiple devices. Also, the computing system 600 may perform the method 500 of FIG. 5. Referring to FIG. 6, the computing system 600 includes a network interface 610, a processor 620, an output 630, and a storage device 640 such as a memory. Although not shown in FIG. 6, the computing system 600 may include other components such as a display, an input unit, a receiver, a transmitter, a text-to-speech converter, and the like.

The network interface 610 may transmit and receive data over a network such as the Internet, a private network, a public network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the computing system 600, an externally connected display, a display connected to the cloud, another device, and the like. The storage device 640 is not limited to a particular storage device and may include any known memory device such as RAM, ROM, hard disk, and the like, and may or may not be included within the cloud environment. The storage 640 may store software modules or other instructions which can be executed by the processor 620 to perform the method 500 shown in FIG. 5.

According to various embodiments, the network interface 610 may receive website data from a host website including images and a description associated with an item listed on the host website. The item may include a real property, a product, a service, a job opportunity, and the like. The processor 620 may extract text content describing the item and still images of the item from the received website data. Furthermore, the processor 620 may automatically convert the extracted text content into an audio file or files by combining keywords from the extracted text content related to the item from the host website with auto-generated supplemental words related to the item to generate an audio script. In addition, the processor 620 may automatically convert the extracted still images from the host website into moving images by arranging the still images extracted from the website in a sequence and adding movement to the still images to generate a video. Furthermore, the output 630 may simultaneously play the automatically generated audio script and the automatically generated video in response to a selection of the item.

According to various embodiments, the content enhancement software described herein may be performed by a web server that auto-detects, extracts, and stores content from around the World Wide Web. For example, the web server may auto-detect vacation travel information from a plurality of travel-related websites on the web such as vacation rental websites, hotel rental websites, flight websites, and the like, including vacation rental housing accommodations, sightseeing information, attraction information, flight information, and the like. As yet another example, the web server may auto-detect information about products, for example, shoes, clothing, materials, consumer goods, furniture, appliances, and the like It should be appreciated that the embodiments are not limited to particular industry or a particular type of item or accommodation.

The example embodiments are directed to enhancing web content associated with an item. The system may extract text content from the web content and generate an audio script which describes the item and which includes supplemental description related to a type of the item. Furthermore, the system may convert the audio script from written text to audio using a text-to-speech converter. The system may also generate video of the item using one or more still images extracted from the web content. For example, the video may including zooming and panning (e.g., Ken Burns Style) of modifying the still images to create more interesting visual content. The generated audio and video may be combined, and timed to play at the same time such that the audio is relevant in time to what is being shown on via the video. Accordingly, web content may be enhanced.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as cloud storage, the Internet of Things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the invention as set forth in the appended claims.

What is claimed is:

1. A computer-implemented method comprising:
   extracting, by a comparison search website, text content describing an item and still images of the item from multiple web pages of a listing on a host website that is independent of the comparison search website and which includes listings of a plurality of items, the extracting of the text content including extracting keywords from a first web page of the listing on the host website which describes the item and a second web page of the listing on the host website which includes user reviews of the item;
   automatically transposing the extracted text content into an audio by combining the keywords from the extracted text content describing attributes of the item from the first and second web pages of the host website within a template that includes supplemental words related to the item to generate an audio script;
   automatically transposing the extracted still images from the host website into moving images by arranging the still images extracted from the website in a sequence and adding movement to the still images to generate a video; and
   simultaneously playing the automatically generated audio script and the automatically generated video in place of the listing on the host website via a single web page of the comparison search website, in response to a selection of the item.

2. The computer-implemented method of claim 1, wherein the host website is monitored by the comparison search website, and the simultaneously playing comprises playing the automatically generated audio script and the automatically generated video via the second website in response to a selection of the item on the comparison search website.

3. The computer-implemented method of claim 1, wherein the audio script comprises a first duration and the video comprises a second duration that is different than the first duration, and the method further comprises overlapping a playing of the audio and a playing of the video based on a shorter duration from among the first and second durations.

4. The computer-implemented method of claim 1, wherein the item comprises a property listing on at least one of a rental site, a travel site, and an accommodation site.

5. The computer-implemented method of claim 4, wherein the automatically transposing of the extracted text content into audio further comprises extracting keywords from one or more of a description of the property and a geographic location of the property, and inserting the extracted keywords into the template to generate the audio script.

6. The computer-implemented method of claim 1, wherein the automatically transposing of the extracted still images comprises removing one or more duplicate still images extracted from the host website prior to generating the video.

7. The computer-implemented method of claim 1, wherein the automatically transposing of the extracted still images comprises removing at least one of a cutoff image and an image unrelated to the item.

8. The computer-implemented method of claim 1, wherein the automatically transposing of the extracted still images from the host website into the moving images comprises adding at least one of panning and zooming to each of the still images to generate the video.

9. A web server comprising:
a network interface configured to receive website data from a host website including images and a description associated with an item listed on the host website;
a processor configured to
extract, by a comparison search website, text content describing the item and still images of the item from multiple pages of a listing on the received website data of the host website, the extracting of the text content includes extracting keywords from a first web page of the listing on the host website which describes the item and a second web page of the listing on the host website which includes user reviews of the item,
automatically transpose the extracted text content into an audio by combining the keywords from the extracted text content describing attributes of the item from the first and second web pages of the host website within a template that includes supplemental words related to the item to generate an audio script, and
automatically transpose the extracted still images from the host website into moving images by arranging the still images extracted from the website in a sequence and adding movement to the still images to generate a video; and
an output configured to simultaneously play the automatically generated audio script and the automatically generated video in place of the listing on the host website via a single web page of the comparison search website, in response to a selection of the item.

10. The computing system of claim 9, wherein the host website is monitored by the web server, and the processor controls the output to simultaneously play the automatically generated audio script and the automatically generated video via the comparison search website hosted by the web server in response to a selection of the item on the comparison search website.

11. The computing system of claim 9, wherein the audio script comprises a first duration and the video comprises a second duration that is different than the first duration, and the processor overlaps a playing of the audio and a playing of the video based on a shorter duration from among the first and second durations.

12. The computing system of claim 9, wherein the item comprises a property listing on at least one of a rental site, a travel site, and an accommodation site.

13. The computing system of claim 12, wherein the processor further extracts keywords from one or more of a description of the property and a geographic location of the property, and inserts the extracted keywords into the template which includes supplemental words related to the property to generate the audio script.

14. The computing system of claim 9, wherein the processor removes one or more duplicate still images extracted from the host website prior to generating the video.

15. The computing system of claim 9, wherein the processor removes at least one of a cutoff image and an image unrelated to the item.

16. The computing system of claim 9, wherein the processor adds at least one of panning and zooming to each of the still images to generate the video.

17. A non-transitory computer readable medium having stored therein instructions that when executed cause a computer to perform a method comprising:
extracting, by a comparison search website, text content describing an item and still images of the item from multiple web pages of a listing on a host website that is independent of the comparison search website and which includes listings of a plurality of items, the extracting of the text content including extracting keywords from a first web page of the listing on the host website which describes the item and a second web page of the listing on the host website which includes user reviews of the item;
automatically transposing the extracted text content into an audio by combining the keywords from the extracted text content describing attributes of the item from the first and second web pages of the host website within a template that includes supplemental words related to the item to generate an audio script;
automatically transposing the extracted still images from the host website into moving images by arranging the still images extracted from the website in a sequence and adding movement to the still images to generate a video; and
simultaneously playing the automatically generated audio script and the automatically generated video in place of the listing on the host website via a single web page of the comparison search website, in response to a selection of the item.

18. The non-transitory computer readable medium of claim 17, wherein the host website is monitored by the comparison search website, and the simultaneously playing comprises playing the automatically generated audio script and the automatically generated video via the second website in response to a selection of the item on the comparison search website.

* * * * *